United States Patent
Tsao et al.

(10) Patent No.: US 8,883,289 B2
(45) Date of Patent: Nov. 11, 2014

(54) FLUID PHILICITY/ PHOBICITY ADJUSTABLE SURFACE STRUCTURE

(75) Inventors: Heng-Kwong Tsao, Taoyuan County (TW); Feng-Ming Chang, Hualien County (TW); Siang-Jie Hong, Taipei (TW)

(73) Assignee: National Central University, Taoyuan County (TW)

( * ) Notice: Subject to any disclaimer, the term of this patent is extended or adjusted under 35 U.S.C. 154(b) by 810 days.

(21) Appl. No.: 13/070,498

(22) Filed: Mar. 24, 2011

(65) Prior Publication Data
US 2012/0135193 A1 May 31, 2012

(30) Foreign Application Priority Data
Nov. 26, 2010 (TW) .............................. 99141068 A

(51) Int. Cl.
B32B 3/00 (2006.01)
B32B 3/30 (2006.01)

(52) U.S. Cl.
CPC ...................................... *B32B 3/00* (2013.01)
USPC ......................................... 428/156; 428/167

(58) Field of Classification Search
USPC .................. 428/141, 156, 167, 913
See application file for complete search history.

(56) References Cited

U.S. PATENT DOCUMENTS

| 4,442,596 A | 4/1984 | Nasu et al. |
| 6,764,745 B1 * | 7/2004 | Karasawa et al. ............. 428/141 |
| 7,267,847 B2 | 9/2007 | Karamuk |
| 2005/0153096 A1 | 7/2005 | Gerber et al. |
| 2010/0168843 A1 | 7/2010 | Hossainy et al. |

FOREIGN PATENT DOCUMENTS

| CN | 101712102 A | 5/2010 |
| TW | 439389 | 6/2001 |
| TW | I253222 | 4/2006 |

OTHER PUBLICATIONS

Wetting Invasion and Retreat across a Corner Boundary (J. Phys. Chem. C 2010, 114, 1615-1621).

* cited by examiner

*Primary Examiner* — Catherine A Simone
(74) *Attorney, Agent, or Firm* — CKC & Partners Co., Ltd.

(57) ABSTRACT

The fluid philicity/phobicity adjustable surface structure is provided to hold a liquid. The surface structure includes a base and many small bumps located on the base. The small bumps are boxy in shape. Every small bump has at least one corner boundary, and the corner boundary is defined as a sudden change of the surface orientation. The gap between every two adjacent small bumps is smaller than the shortest cohesion diameter of the liquid. Additionally, the contact angle between the liquid and the hydrophilic hydrophobic adjustable surface structure is $\theta$ which satisfies the condition: $\theta^* \leq \theta \leq (180-\alpha)+\theta^*$, where $\theta^*$ is the contact angle between the base and the liquid, $\alpha$ is the boundary edge angle of the small bump.

11 Claims, 4 Drawing Sheets

FLUID PHILICITY/PHOBICITY ADJUSTABLE SURFACE STRUCTURE

RELATED APPLICATIONS

This application claims priority to Taiwan Patent Application Serial Number 099141068, filed on Nov. 26, 2010. The entire disclosure of the application is hereby incorporated by reference herein.

BACKGROUND

1. Technical Field

The present disclosure relates to a surface structure. More particularly, the present disclosure relates to a surface structure for controlling wetting invasion or retreat.

2. Description of Related Art

Referring to FIG. 1, FIG. 1 is a schematic view depicting a contact angle between a liquid and a base in prior art. Generally speaking, the contact angle $\theta^*$ between the liquid 100 and the base 200 is defined by Young's equation:

$$\cos \theta^* = (T2-T1)/T3$$

where T1, T2 and T3 represent the interfacial tensions of base-liquid, base-air and liquid-air interfaces. Taking water as an instance, the contact angle $\theta^*$ is larger than 90 degrees when the base is a hydrophobic material. Therefore, an interface modifier is required for changing the wettability to meet some industrial purposes. However, the wide use of various interface modifier has been proven to pollute the environment extremely.

SUMMARY

Hence, an aspect of the disclosure is to provide a fluid philicity/phobicity adjustable surface structure for changing the wettability to replace the interface modifier.

According to one embodiment of the disclosure, a fluid philicity/phobicity adjustable surface structure is provided to hold a liquid. The surface structure includes a base and many small bumps disposed on the base. The small bumps are boxy in shape. In detail, every small bump has at least one corner boundary, and the corner boundary is defined as a sudden change, i.e. the differential discontinuous point in mathematics, of the surface orientation. The gap between every two adjacent small bumps is smaller than the shortest cohesion diameter of the liquid, wherein the shortest cohesion diameter is determined on the basis of free energy minimization. Additionally, the contact angle between the liquid and the fluid philicity/phobicity adjustable surface structure is $\theta$ which satisfies the following condition:

$$\theta^* \leq \theta \leq (180-\alpha)+\theta^*$$

where $\theta^*$ is the contact angle between the base and the liquid, and $\alpha$ is the boundary edge angle of the small bump. In detail, the boundary edge angle $\alpha$ is the solid edge angle subtended by the two surfaces forming the edge, and $\alpha$ is smaller than 180 degrees.

In other words, the wettability of the surface structure is larger than the intrinsic wettability of the base when the boundary edge angle $\alpha$ is 90-180 degrees, and the wettability of the surface structure is smaller than the intrinsic wettability of the base when the boundary edge angle $\alpha$ is 0-90 degrees. Therefore, the fluid philicity/phobicity property of the surface structure can be adjusted by controlling the boundary edge angle of the bumps.

According to another embodiment of the disclosure, the side view of the small bump is a trapezoid and the bottom of the trapezoid can be designed to be larger than the top of the trapezoid. For instance, the boundary edge angle of the small bump is 90-180 degrees, such as 130 degrees. On the contrary, the bottom of the trapezoid can also be designed to be smaller than the top of the trapezoid. For instance, the boundary edge angle of the small bump is 0-90 degrees, such as 60 degrees. Additionally, the small bumps can be achieved by conical frustums or square frustums, and thus the cross-section of the small bump is a circle or a square respectively. In consideration of the manufacturing, the small bumps can be formed by processing the base, and thus the small bumps and the base are monolithically formed. In consideration of the raw material, the material forming the base can be selected from fluoride polymers, is cuprous oxide, polysiloxane compounds, silicon dioxide, metal oxides or acrylic.

Therefore, the embodiments of the disclosure provide the fluid philicity/phobicity adjustable surface structures for not only meeting the wettability changing requirement without using the interface modifier that pollutes environment but also decreasing the cost of production greatly.

DETAILED DESCRIPTION

Figure 1:
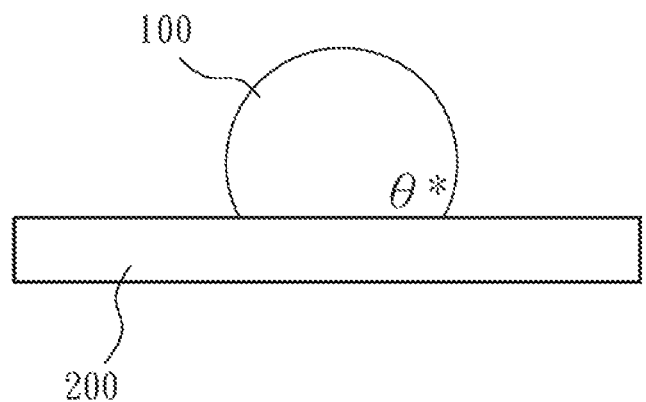
FIG. 1 is a schematic view depicting a contact angle between a liquid and a base in prior art.
Figure 2A:
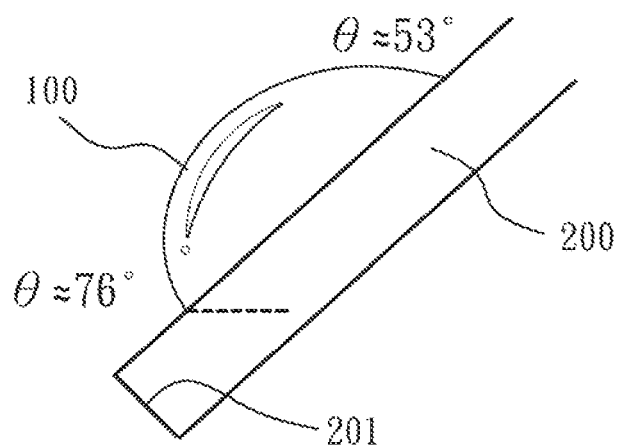
FIG. 2A is a schematic view depicting the contact angle when the liquid is water and the base is tilted.
Figure 2B:
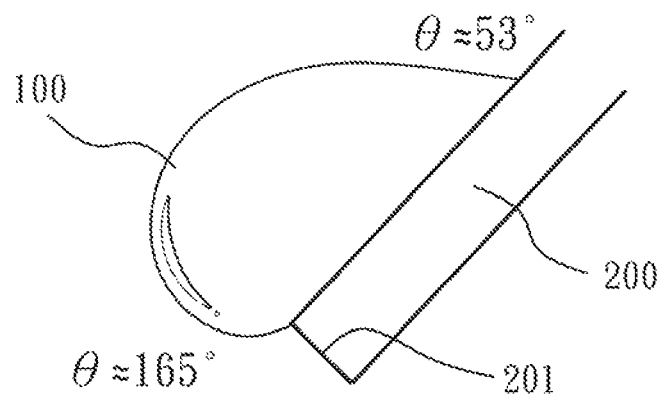
FIG. 2B is a schematic view depicting the edge effect occurring in FIG. 2A.

Referring to FIG. 2A-2B, FIG. 2A-2B are schematic views showing the edge effect occurring between a liquid and a base. The edge effect means that the contact line between the liquid and the base does not follow Young's equation when the contact line reaches the edge. Specifically, the contact line is pinning at the edge due to the boundary minimum of the free energy.

In FIG. 2A, taking water as an instance, when the liquid 100 is a droplet atop the inclined base 200, the gravity and surface tension of the liquid 100 causes the top contact angle to be about 53 degrees and the bottom contact angel to be about 76 degrees. In FIG. 2B, when the droplet reaches the edge, the bottom contact angle is increased due to the edge effect. In other words, the base 200 is more fluid phobicity than usual, and the liquid 100 does not wet the edge surface. Therefore, in the embodiment, the surface structure of the base 200 is changed to induce the edge effect, and thus to adjust the fluid philicity/phobicity property of the base 200 without using chemicals.

Figure 3:
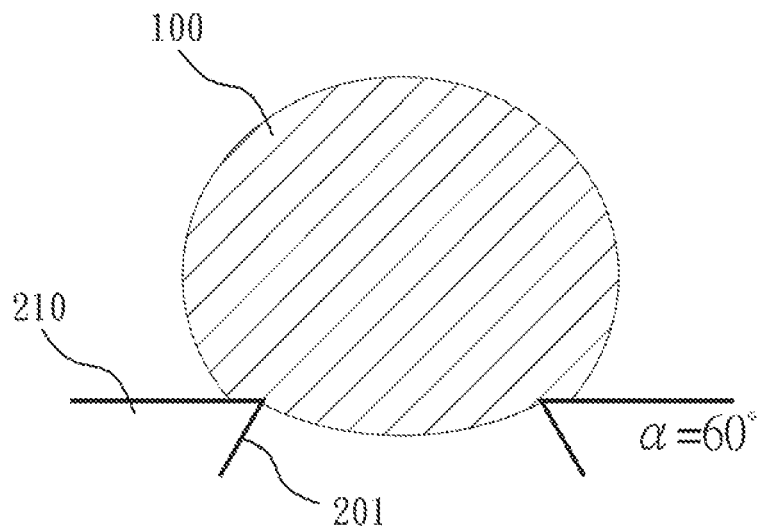
FIG. 3 is a schematic view of one embodiment of the disclosure depicting the fluid phobicity surface structure.

Referring to FIG. 3, FIG. 3 is a schematic view of one embodiment of the disclosure depicting the fluid phobicity surface structure. In FIG. 3, take water as an instance, the intrinsic contact angle $\theta^*$ that represents the hydrophobicity of the base 200 is 140 degrees. Many boxy small bumps 210 are formed on the base 200, and the boundary edge angle of the small bump 210 is 60 degrees. Additionally, the distance of the gap between two adjacent bumps 210 is smaller than 2.7 mm, i.e. the shortest cohesion diameter of water. It is both confirmed by computer analyzing and actual observation that the hydrophobicity of the hydrophobic base 200 is increased when the liquid 100 reaches the boundary edge 201.

Figure 4:
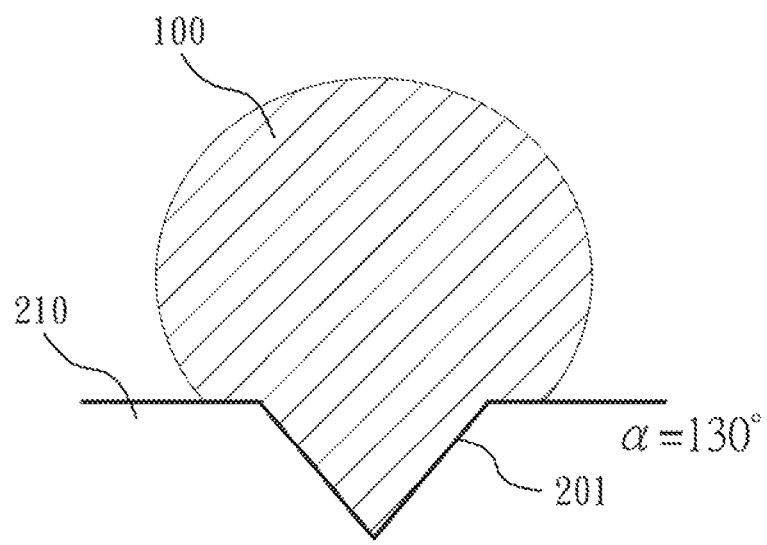
FIG. 4 is a schematic view of another embodiment of the disclosure depicting the fluid philicity surface structure.

Referring to FIG. 4, FIG. 4 is a schematic view of another embodiment of the disclosure depicting the fluid philicity surface structure. In FIG. 4, the intrinsic contact angle $\theta^*$ that represents the hydrophilicity of the base is also 140 degrees. Many boxy small bumps 210 are formed on the surface of the base 200, and the boundary edge angle of the small bump 210 is 130 degrees. In other words, the bases in FIG. 3 and FIG. 4 are the same, but the shapes of the small bumps 210 are different. The distance of the gap between two adjacent bumps 210 is also smaller than 2.7 mm. It is both confirmed by computer analyzing and actual observation that the hydrophobicity of the hydrophobic base 200 is decreased when the liquid 100 reaches the boundary edge 201. Therefore, the surface wettability property of the hydrophobic base 200 can be changed to be hydrophilic by designing the shape of the small bumps 210.

Figure 5:
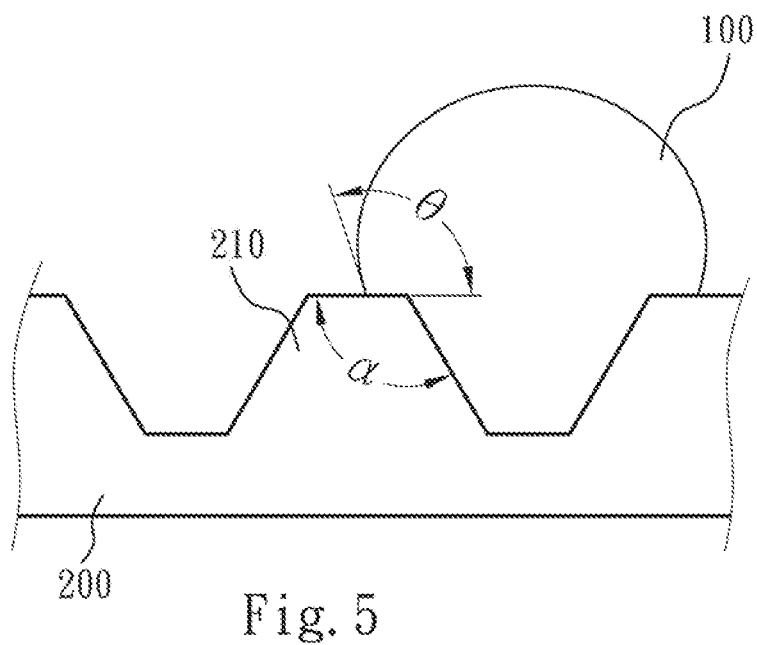
FIG. 5 is a cross-sectional view of the surface structure of another embodiment similar to FIG. 4.

As described in FIG. 3 and FIG. 4, the hydrophilic/hydrophobic property of the base 200 can be adjusted by controlling the surface structure of itself. Therefore, the embodiments can be applied in many products such as the functional cloth that are waterproof and good for expelling sweat, the building walls that are waterproof and good for moist elimination, and the liquid-solid interfaces in many industries Referring to FIG. 5, FIG. 5 is a cross-sectional view of the surface structure of another embodiment similar to FIG. 4. In FIG. 5, the small bumps 210 are designed to be trapezoids, and the bottom of the trapezoid is larger than the top of the trapezoid. When the liquid 100 is dropped on the small bump 210, the boundary edge angle that are between 90-180 degrees causes the base 200 to be more hydrophilic than original, and thus the wettability between the water and the base 200 is increased.

Figure 6:
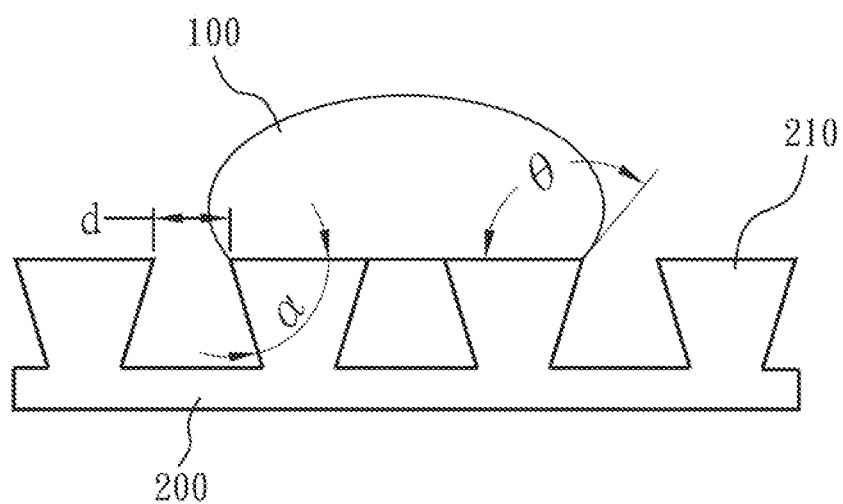
FIG. 6 is a cross-sectional view of the surface structure in FIG. 3.

Referring to FIG. 6, FIG. 6 is a cross-sectional view of the surface structure in FIG. 3. In FIG. 6, the small bumps 210 are designed to be trapezoids, and the bottom of the trapezoid is smaller than the top of the trapezoid. When the liquid 100 is dropped on the small bump 210, the distance d of the gap between two adjacent small bumps 210 is shorter than the shortest cohesion diameter of the liquid 100. On the other hand, the boundary edge angle is between 0-90 degrees. Therefore, the contact angle between the liquid 100 and the surface structure of the base 200 is larger than the intrinsic contact angle between the liquid 100 and a planar of the base 200. In other words, the wettability between the liquid 100 and the base 200 is decreased.

Figure 7A:
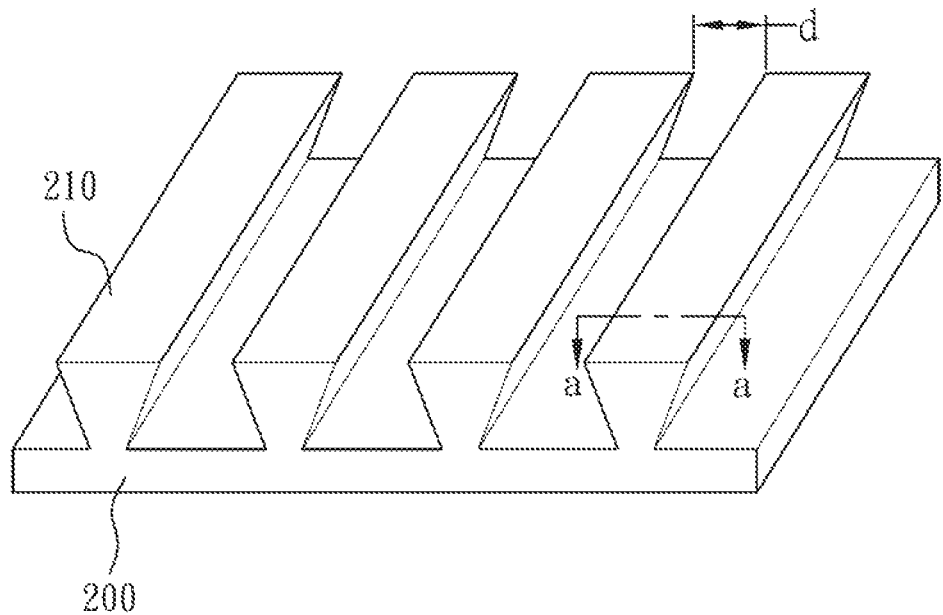
FIG. 7A is a stereogram in another embodiment relating to FIG. 6.
Figure 7B:
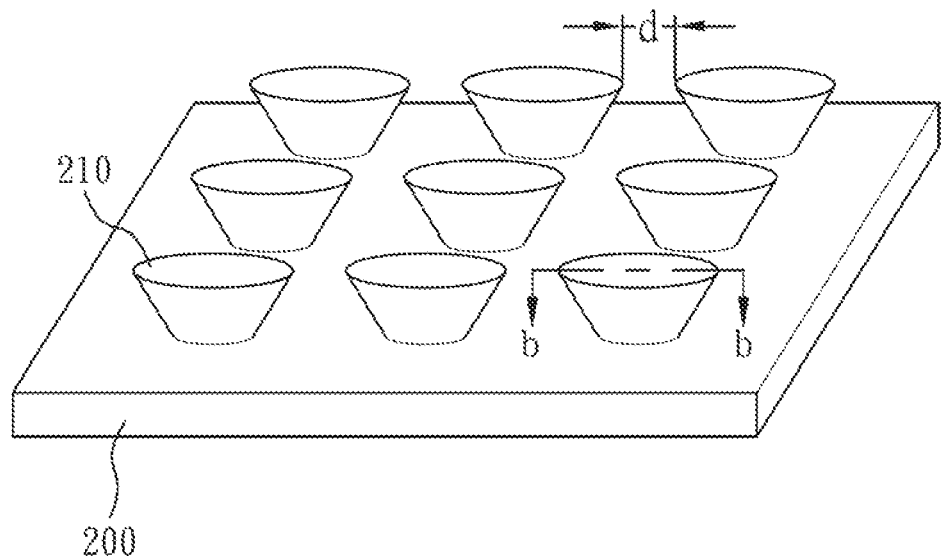
FIG. 7B is a stereogram in another embodiment relating to FIG. 6.

Referring to FIGS. 7A and 7B, FIG. 7A and FIG. 7B are stereogram in another embodiments relating to FIG. 6. In FIG. 7A, the small bumps 210 are long square ribs, and thus the top view of the small bump 210 is a long square. In FIG. 7B, the small bumps 210 are conical frustums, and thus the top view of the small bump 210 is a circle. Additionally, the small bumps 210 are formed by processing the base 200, and thus the small bumps 210 and the base 200 are monolithically formed. In consideration of the raw material, the material forming the base 200 can be selected from hydrophobic materials such as fluoride polymers, cuprous oxide, polysiloxane compounds, or hydrophilic materials such as silicon dioxide, metal oxides or acrylic.

As described above, the surface structure of the embodiment includes a base and many small bumps that are located on the base. The small bumps are boxy and the gap between every two adjacent small bumps is smaller than the shortest cohesion diameter of the liquid. In detail, the contact angle between the base and the liquid is $\theta^*$, and the boundary edge angle of the small bump is $\alpha$, and thus the contact angle between the liquid and the fluid philicity/phobicity adjustable surface structure is $\theta$, wherein $\theta$ follows the condition: $\theta^* \leq \theta \leq (180-\alpha)+\theta^*$.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fluid philicity/phobicity adjustable surface structure for holding a liquid, comprising:
   a base; and
   a plurality of small bumps located on the base, the small bumps being boxy and the gap between every two adjacent small bumps being smaller than the shortest cohesion diameter of the liquid;
   wherein the contact angle between the base and the liquid is $\theta^*$, and the boundary edge angle of the small bump is $\alpha$, and the contact angle between the liquid and the hydrophilic/hydrophobic adjustable surface structure is $\theta$, where $\theta^* \leq \theta \leq (180-\alpha)+\theta^*$.

2. The fluid philicity/phobicity adjustable surface structure of claim 1, wherein the side view of the small bump is a trapezoid and the bottom of the trapezoid is larger than the top of the trapezoid.

3. The fluid philicity/phobicity adjustable surface structure of claim 2, wherein the boundary edge angle of the small bump is 90-180 degrees.

4. The fluid philicity/phobicity adjustable surface structure of claim 3, wherein the boundary edge angle of the small bump is 130 degrees.

5. The fluid philicity/phobicity adjustable surface structure of claim 1, wherein the side view of the small bump is a trapezoid and the bottom of the trapezoid is smaller than the top of the trapezoid.

6. The fluid philicity/phobicity adjustable surface structure of claim 5, wherein the boundary edge angle of the small bump is 0-90 degrees.

7. The fluid philicity/phobicity adjustable surface structure of claim wherein the boundary edge angle of the small bump is 60 degrees.

8. The fluid philicity/phobicity adjustable surface structure of claim 1, wherein the cross-section of the small bump is a circle.

9. The fluid philicity/phobicity adjustable surface structure of claim 1, wherein the cross-section of the small bump is a square.

10. The fluid philicity/phobicity adjustable surface structure of claim 1, wherein the small bumps are formed by processing the base, and thus the small bumps and the base are monolithically formed.

11. The fluid philicity/phobicity adjustable surface structure of claim 1, wherein the material forming the base is selected from the group consisting of fluoride polymers, cuprous oxide, polysiloxane compounds, silicon dioxide, metal oxides and acrylic glass.

* * * * *